US008396219B2

(12) United States Patent
Majima

(10) Patent No.: US 8,396,219 B2
(45) Date of Patent: Mar. 12, 2013

(54) SCRAMBLER, SCRAMBLE PROCESSING METHOD, AND PROGRAM

(75) Inventor: Taichi Majima, Yokohama (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 0 days.

(21) Appl. No.: 12/420,313

(22) Filed: Apr. 8, 2009

(65) Prior Publication Data

US 2009/0202066 A1 Aug. 13, 2009

Related U.S. Application Data

(62) Division of application No. 11/663,552, filed as application No. PCT/JP2005/018492 on Sep. 29, 2005.

(30) Foreign Application Priority Data

Sep. 30, 2004 (JP) .................................. 2004-287157

(51) Int. Cl.
*H04L 9/00* (2006.01)
(52) U.S. Cl. ........................... 380/268; 380/28; 375/140
(58) Field of Classification Search .................. 380/268, 380/28; 375/140
See application file for complete search history.

(56) References Cited

U.S. PATENT DOCUMENTS

| 4,047,151 A | 9/1977 | Rydbeck |
| 4,277,778 A | 7/1981 | Persson |
| 4,534,040 A | 8/1985 | Thapar |
| 4,616,702 A | 10/1986 | Hanson et al. |
| 4,888,799 A | 12/1989 | Mobley et al. |
| 4,897,857 A | 1/1990 | Wakatsuki et al. |
| 4,901,072 A | 2/1990 | Fox |
| 4,984,191 A | 1/1991 | Vermesse |
| 5,214,656 A | 5/1993 | Chung et al. |
| 5,457,705 A | 10/1995 | Todoroki |
| 5,473,612 A | 12/1995 | Dehner, Jr. et al. |

(Continued)

FOREIGN PATENT DOCUMENTS

| CA | 2300852 | 3/1999 |
| CN | 1278379 | 12/2000 |

(Continued)

OTHER PUBLICATIONS

Machine Translation of JP2004-200972.*

(Continued)

*Primary Examiner* — Ashok Patel
*Assistant Examiner* — Brian Shaw
(74) *Attorney, Agent, or Firm* — Eric J. Robinson; Robinson Intellectual Property Law Office, P.C.

(57) ABSTRACT

A multiplication value decision unit (12) decides a multiplication value which is a positive value or a negative value corresponding to a bit value of each bit contained in a binary bit string constituting a scramble pattern generated in a pattern generation unit (11). A multiplication processing unit (13) multiplies symbol data representing each symbol value in the symbol data string formed by the multinary symbol containing a predetermined pair of a positive value and a negative value having an identical absolute value, in the value area, by the multiplication value decided by the multiplication value decision unit (12). Here, the multiplication processing unit (13) successively executes the multiplication between the symbol data for one symbol and the multiplication value decided corresponding to the bit value of the one bit contained in the scramble pattern until the number of symbols expressed by the symbol data string is reached. The present invention scrambles the data string by a simple operation and performs scramble by a simple processing even when the function channel content is changed.

10 Claims, 7 Drawing Sheets

U.S. PATENT DOCUMENTS

| | | | |
|---|---|---|---|
| 5,566,213 | A | 10/1996 | Carsello |
| 5,677,681 | A | 10/1997 | Tanaka et al. |
| 5,818,875 | A | 10/1998 | Suzuki et al. |
| 5,828,672 | A | 10/1998 | Labonte et al. |
| 5,835,508 | A | 11/1998 | Kushita |
| 5,881,071 | A | 3/1999 | Kuznetsov et al. |
| 6,125,148 | A | 9/2000 | Frodigh et al. |
| 6,157,679 | A | 12/2000 | Johnson |
| 6,232,906 | B1 | 5/2001 | Tada |
| 6,249,212 | B1 | 6/2001 | Beigel et al. |
| 6,311,306 | B1 | 10/2001 | White et al. |
| 6,512,748 | B1 | 1/2003 | Mizuki et al. |
| 6,934,317 | B1 * | 8/2005 | Dent ............... 375/140 |
| 2002/0040460 | A1 | 4/2002 | Choi et al. |
| 2003/0039229 | A1 | 2/2003 | Ostman |
| 2003/0099359 | A1 | 5/2003 | Hui |
| 2003/0167425 | A1 | 9/2003 | Bader et al. |
| 2003/0206602 | A1 * | 11/2003 | Yamamoto ............ 375/303 |
| 2005/0047323 | A1 | 3/2005 | Clarkson et al. |
| 2005/0243941 | A1 * | 11/2005 | Anim-Appiah et al. ...... 375/265 |
| 2007/0136637 | A1 | 6/2007 | Majima |
| 2007/0160163 | A1 | 7/2007 | Majima |
| 2009/0193309 | A1 | 7/2009 | Majima |
| 2009/0202065 | A1 | 8/2009 | Majima |

FOREIGN PATENT DOCUMENTS

| | | |
|---|---|---|
| EP | 0 727 891 | 8/1996 |
| EP | 1 388 965 | 2/2004 |
| EP | 1 732 258 | 12/2006 |
| JP | 2003-174485 | 7/1981 |
| JP | 63-172535 | 7/1988 |
| JP | 63-174445 | 7/1988 |
| JP | 07-015353 | 1/1995 |
| JP | 11-220762 | 8/1999 |
| JP | 2001-515301 | 9/2001 |
| JP | 2003-143243 | 5/2003 |
| JP | 2003-158502 | 5/2003 |
| JP | 2003-338852 | 11/2003 |
| JP | 2004-200972 | 7/2004 |
| WO | WO 97/33402 | 9/1997 |
| WO | WO 99/12283 | 3/1999 |
| WO | WO 01/26236 | 4/2001 |
| WO | WO 02/069546 | 9/2002 |
| WO | WO 03-049392 | 6/2003 |
| WO | WO 03/063465 | 7/2003 |

OTHER PUBLICATIONS

Harris et al. (2004). The ABCs of Linear Block Codes. IEEE Signal Processing Magazine vol. 21, Issue 4.*
Shibata (1993). Machine Translation JP05284147.*
Parker (Computer crime: Criminal justice resource manual, 1989).*
International Search Report for PCT/JP2005/018492 dated Jan. 24, 2006.
International Preliminary Examination Report (Application No. PCT/JP2005/018492) dated Jun. 28, 2007.
Office Action (JP Application No. 2004-287157) dated Apr. 1, 2010.
Office Action (U.S. Appl. No. 11/663,552) dated Dec. 16, 2009.
Office Action (U.S. Appl. No. 11/663,552) dated Jun. 10, 2010.
Office Action (U.S. Appl. No. 11/663,552) dated Oct. 20, 2010.
Office Action (U.S. Appl. No. 11/663,552) dated Feb. 28, 2011.
International Search Report (PCT/JP2004/019721) dated Mar. 1, 2005.
Notification of Transmittal of Translation of the International Preliminary Report on Patentability (PCT/JP2004/019721) dated Aug. 31, 2006.
Supplementary European Search Report (Application No. 04808071.7) dated Jan. 30, 2008.
Written Notification of Reason for Refusal (JP 2003-435638) dated Apr. 1, 2008.
Morimoto, et al., "A Study on a Hierarchical Image Transmission System in a Rayleigh Fading Channel," Department of Communications Engineering, Faculty of Engineering, Osaka University Institute of Electronics, Information Communication Engineers (IEICE), vol. 96, No. 49, May 21, 1996, pp. 33-38.
Office Action (U.S. Appl. No. 10/582,615) dated Mar. 18, 2009.
Office Action (U.S. Appl. No. 10/582,615) dated Sep. 22, 2009.
Office Action (U.S. Appl. No. 10/582,615) dated Jan. 14, 2010.
Office Action (U.S. Appl. No. 10/582,615) dated Feb. 17, 2010.
Office Action (U.S. Appl. No. 10/582,615) dated Sep. 7, 2010.
Notification of Transmittal of Translation of the International Preliminary Report on Patentability (Application No. PCT/JP2004/018536) dated Aug. 31, 2006.
Written Notification of Reason for Refusal (Application No. JP 2003-409688) dated Jul. 8, 2008.
Supplementary European Search Report (Application No. 04801628.8) dated Dec. 16, 2008.
Office Action (U.S. Appl. No. 10/581,667) dated Sep. 1, 2009.
Office Action (U.S. Appl. No. 10/581,667) dated Mar. 10, 2010.
Office Action (U.S. Appl. No. 10/581,667) dated Sep. 10, 2010.
Office Action (U.S. Appl. No. 10/581,667) dated Mar. 14, 2011.
European Search Report (Application No. 09005333.1) dated Jun. 19, 2009.
Office Action (U.S. Appl. No. 12/419,559) dated Mar. 12, 2010.
Office Action (U.S. Appl. No. 12/419,559) dated Sep. 14, 2010.
Office Action (U.S. Appl. No. 12/419,559) dated Mar. 18, 2011.
Office Action (U.S. Appl. No. 12/419,559) dated Nov. 10, 2011.
Office Action (U.S. Appl. No. 10/581,667) dated Dec. 13, 2011.
Notification of Reason for Refusal (Application No. 2008-230306) dated Jul. 19, 2011.
Nakamura, et al. "Data Scramblers for Multi-level Pulse Sequences," NEC Research and Development, Nippon Electric LTD. Tokyo, JP, No. 26, Jul. 1, 1972, pp. 53-63.
Viterbi, et al. "A Pragmatic Approach to Trellis-Coded Modulation," IEEE Communications Magazine, IEEE Service Center, Piscataway, US, vol. 27, No. 7, Jul. 1, 1989, pp. 11-19.
European Search Report (Application No. 09005329.9) dated Sep. 10, 2012.
Supplementary European Search Report (Application No. 05790275.1) dated Sep. 10, 2012.
Office Action (U.S. Appl. No. 10/581,667) dated Aug. 13, 2012.
Office Action (U.S. Appl. No. 12/419,559) dated Oct. 31, 2012.

* cited by examiner

FIG. 7

| (A) SYMBOL DATA (BEFORE SCRAMBLING) | (B) SCRAMBLED PATTERN | (C) MULTIPLICATION VALUE | (D) OUTPUT SYMBOL (AFTER SCRAMBLING) |
|---|---|---|---|
| +3 | 0 | −1 | −3 |
| +1 | 1 | +1 | +1 |
| +1 | 1 | −1 | −1 |
| +3 | 1 | +1 | +3 |
| +1 | 1 | +1 | +1 |
| +1 | 0 | −1 | −1 |
| +1 | 1 | +1 | +1 |
| +3 | 0 | −1 | −3 |

FIG. 8
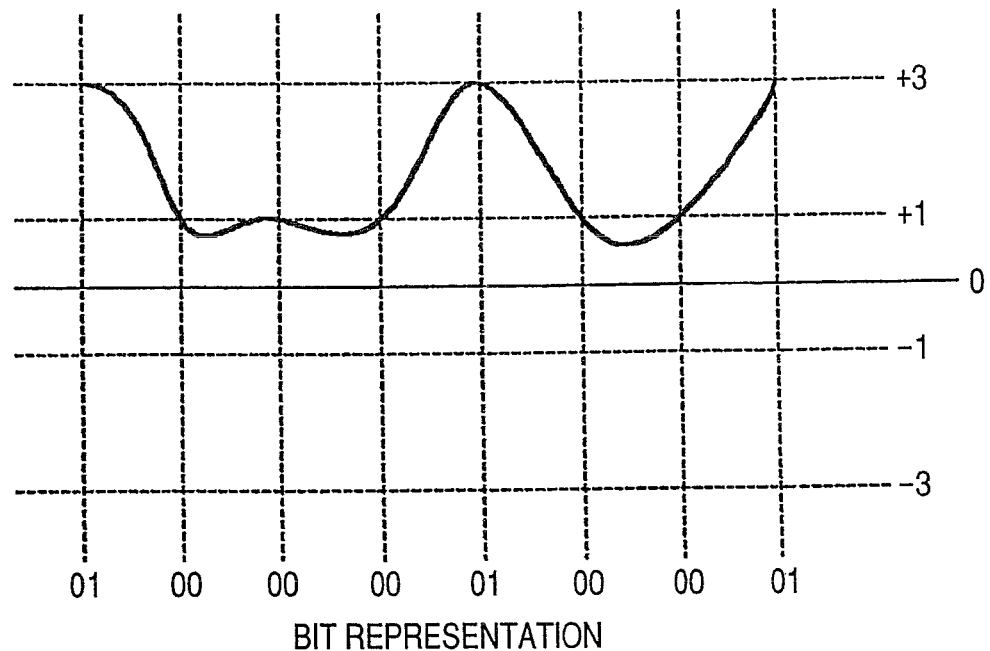
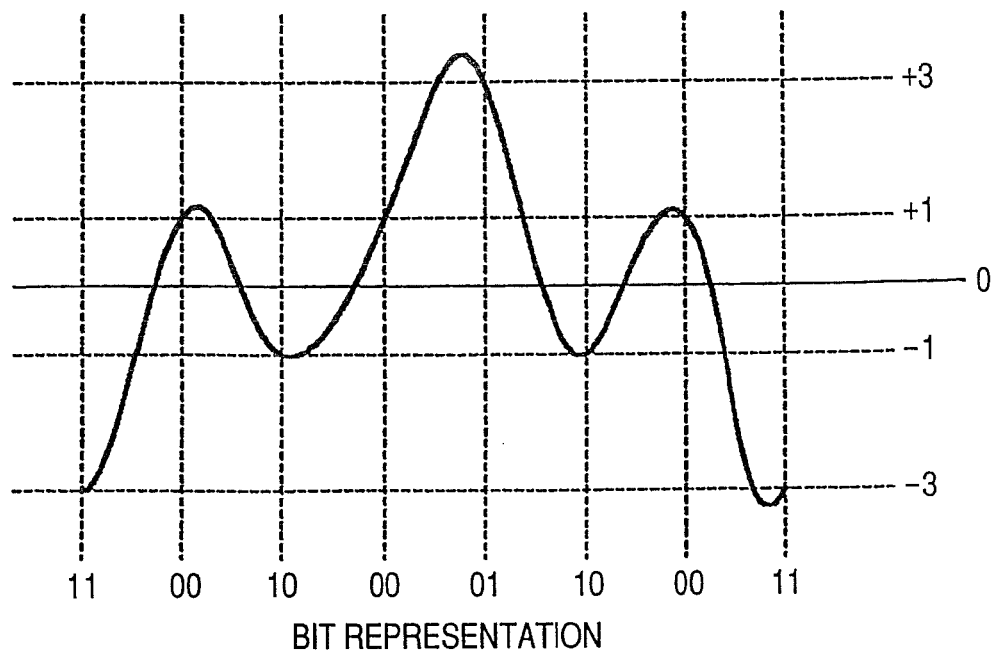

SCRAMBLER, SCRAMBLE PROCESSING METHOD, AND PROGRAM

TECHNICAL FIELD

The present invention relates to a scrambler, a baseband signal generation device, a scramble processing method, a baseband signal generating method, and a program.

BACKGROUND ART

When a communication is established using a multivalue digital modulation system such as a 4-value FSK (frequency shift keying) modulation and the like, a Euclid distance in a significant bit element takes values as largely as possible as compared with another bit element that is relatively not significant by temporarily applying binary (or a value lower than a normal value) modulation. This process enables a practically equivalent function of correcting an error in data to be transmitted.

In addition, to avoid the concentration of energy due to a modulation bias or to allow confidentiality for information, data on a transmission line is frequently scrambled. Thus, by scrambling data, a modulation signal can be dispersed like pseudo noise (PN) although, for instance, original information data indicates an identical value (for a specific example, data indicating all "0"). Conventionally when data is scrambled, an exclusive logical sum (ExOR) of target information data and a scramble pattern as a prepared bit string has been determined by a logical operation circuit and the like (refer to, for instance, "Narrow Band Digital Communication System (SCPC/FDMA)" by Association of Radio Industries and Businesses, Standard Specification ARIB STD-T61 version 1.0, vol. 2, May 27, 1999, p. 142-143). The scramble pattern is often generated as a PN code sequence and the like. It is commonly designed that various scramble patterns can be generated by setting an initial value to be provided for a generator of a PN code as a variable scramble code.

Described below is, for an example, in the data transmission system of a frame structure configured by an information data set as a synchronous word and a function channel, a procedure of scrambling a predetermined data string in one frame. The synchronous word is a timing signal for use in performing a decoding process, and an information data set is a set of data classified for each function such as audio data, data for communication control, etc.

In this case, after performing an error correction coding process individually on each function channel to be included in one frame, the function channels are combined together to assemble into one frame. A frame in a non-scrambled state is completed, then an exclusive logical sum of a predetermined data string and a scramble pattern is determined, thereby generating a transmitting data string. Thus, the generated transmitting data string is converted into symbol data, and then used as modulating data in modulating a carrier wave and the like, and transmitted to a transmission line. On a transmission data reception side, the transmitting data is demodulated, and then descrambled in the inverse procedure of the scrambling procedure, thereby an original information data set and the like can be reconstructed.

Thus, the scrambling process on a data string forming one frame is performed on each bit value immediately before performing a conversion into symbol data.

As mentioned above, to set a longer Euclid distance in the significant bit element than the distances of other bit elements, it is important to appropriately arrange each piece of data in the symbol data. Therefore, if the scrambling process is performed on each bit value before performing a conversion into symbol data as in the conventional technique, it is difficult to sufficiently set the Euclid distance for a significant bit element.

Then, after scrambling a data string, a predetermined process is performed on a portion corresponding to a significant bit element, thereby possibly improving the error resistance of the portion. In this case, it is necessary to perform the process again on each function channel after once forming a frame. Therefore, there is the problem that the process is complicated when the position of a significant bit element is changed after the contents of the function channel are changed, for instance, such as when audio data is changed into data for communication control.

DISCLOSURE OF THE INVENTION

The present invention has been made to solve the above-mentioned problem, and an objective of the present invention is to provide a scrambler or the like capable of scrambling a data string in a simple operation when error resistance is to be improved in a multivalue modulation system, and scrambling data in a simple process even when the contents of a function channel are changed.

To attain the above-mentioned objective, the scrambler according to the first aspect of the present invention basically includes: pattern generation means for generating a scramble pattern; multiplication value decision means for determining a positive or negative multiplication value corresponding to a bit value of each bit in a binary bit string forming a scramble pattern generated by the pattern generation means; and multiplication processing means for multiplying each piece of symbol data in a symbol data string expressing a string of multinary symbols including in a value area at least a predetermined pair of a positive value and a negative value having an identical absolute value with the multiplication value determined corresponding to the bit value of each bit in the scramble pattern by the multiplication value decision means.

Then, it is preferable that the multiplication value decision means operates such that the multiplication value is determined to −1 when the bit value included in the scramble pattern is a bit value predetermined as an inverse operation value, and is determined to +1 when the bit value included in the scramble pattern is a bit value predetermined as a non-inverse operation value.

A baseband signal generation device according to the second aspect of the present invention includes: symbol data generation means for receiving a supply of data whose significance level is predetermined, adding redundant bit data by dividing each bit of significant bit data, and dividing less significant bit data by a predetermined number of bits, thereby generating symbol data representing a multinary symbol including in a value area at least a predetermined pair of a positive value and a negative value having an identical absolute value; pattern generation means for generating a scramble pattern; multiplication value decision means for determining a positive or negative multiplication value corresponding to a bit value of each bit included in a binary bit string forming the scramble pattern generated by the pattern generation means; multiplication processing means for performing multiplication between each piece of the symbol data generated by the symbol data generation means and the multiplication value determined by the multiplication value decision means; and baseband signal generation means for generating a baseband signal representing a string of a multinary symbol acquired as a result of the multiplication by the multiplication processing means.

It is preferable that the symbol data generation means performs such that bit data as redundant bit data, in the baseband signal generated by the baseband signal generation means, whose minimum value of a difference between momentary values of two points representing two symbols including the redundant bit data and having different values is larger than a minimum value of a difference between momentary values of two points representing two symbols including no redundant bit data and having different values is added to each bit of significant bit data.

The scramble processing method according to the third aspect of the present invention is a scramble processing method using a data processing device, and includes: a pattern generating step of generating a scramble pattern; a multiplication value decision step of determining a positive or negative multiplication value corresponding to a bit value of each bit in a binary bit string forming a scramble pattern generated in the pattern generation step; and a multiplication processing step of multiplying each piece of symbol data in a symbol data string expressing a string of multinary symbols including in a value area at least a predetermined pair of a positive value and a negative value having an identical absolute value with the multiplication value determined corresponding to the bit value of each bit in the scramble pattern in the multiplication value decision step.

The baseband signal generating method according to the fourth aspect of the present invention is a baseband signal generating method using a baseband signal generation device for generating a baseband signal representing a string of multinary symbols, and includes: a symbol data generation step of receiving a supply of data whose significance level is predetermined, adding redundant bit data by dividing each bit of significant bit data, and dividing less significant bit data by a predetermined number of bits, thereby generating symbol data representing a multinary symbol including in a value area at least a predetermined pair of a positive value and a negative value having an identical absolute value; a pattern generation step of generating a scramble pattern; a multiplication value decision step of determining a positive or negative multiplication value corresponding to a bit value of each bit included in a binary bit string forming the scramble pattern generated by the pattern generation means; a multiplication processing step of performing multiplication between each piece of the symbol data generated in the symbol data generation step and the multiplication value determined in the multiplication value decision step means; and a baseband signal generation step of generating a baseband signal representing a string of a multinary symbol acquired as a result of the multiplication in the multiplication processing step.

A program according to the fifth aspect of the present invention enables a computer to perform the process including: a pattern generating step of generating a scramble pattern; a multiplication value decision step of determining a positive or negative multiplication value for a bit value of each bit in a binary bit string forming a scramble pattern generated in the pattern generation step; and a multiplication processing step of multiplying each piece of symbol data in a symbol data string expressing a string of multinary symbols including in a value area at least a predetermined pair of a positive value and a negative value having an identical absolute value with the multiplication value determined corresponding to the bit value of each bit in the scramble pattern in the multiplication value decision step.

The program according to the sixth aspect of the present invention enables a computer to perform the process including: a symbol data generation step of receiving a supply of data whose significance level is predetermined, adding redundant bit data by dividing each bit of significant bit data, and dividing less significant bit data by a predetermined number of bits, thereby generating symbol data representing a multinary symbol including in a value area at least a predetermined pair of a positive value and a negative value having an identical absolute value; a pattern generation step of generating a scramble pattern; a multiplication value decision step of determining a positive or negative multiplication value corresponding to a bit value of each bit included in a binary bit string forming the scramble pattern generated by the pattern generation means; a multiplication processing step of performing multiplication between each piece of the symbol data generated in the symbol data generation step and the multiplication value determined in the multiplication value decision step means; and a baseband signal generation step of generating a baseband signal representing a string of a multinary symbol acquired as a result of the multiplication in the multiplication processing step.

The present invention can scramble a data string in a simple operation, and also scramble data in a simple process even when the contents of a function channel change.

BRIEF DESCRIPTION OF THE DRAWINGS

FIG. 7 shows a practical example of an output value in each portion of a scrambler; and FIG. 8 shows a practical example of an operation of generating a baseband signal.

BEST MODE FOR CARRYING OUT THE INVENTION

The scrambler according to a mode for embodying the present invention is explained below in detail by referring to the attached drawings.

Figure 1:
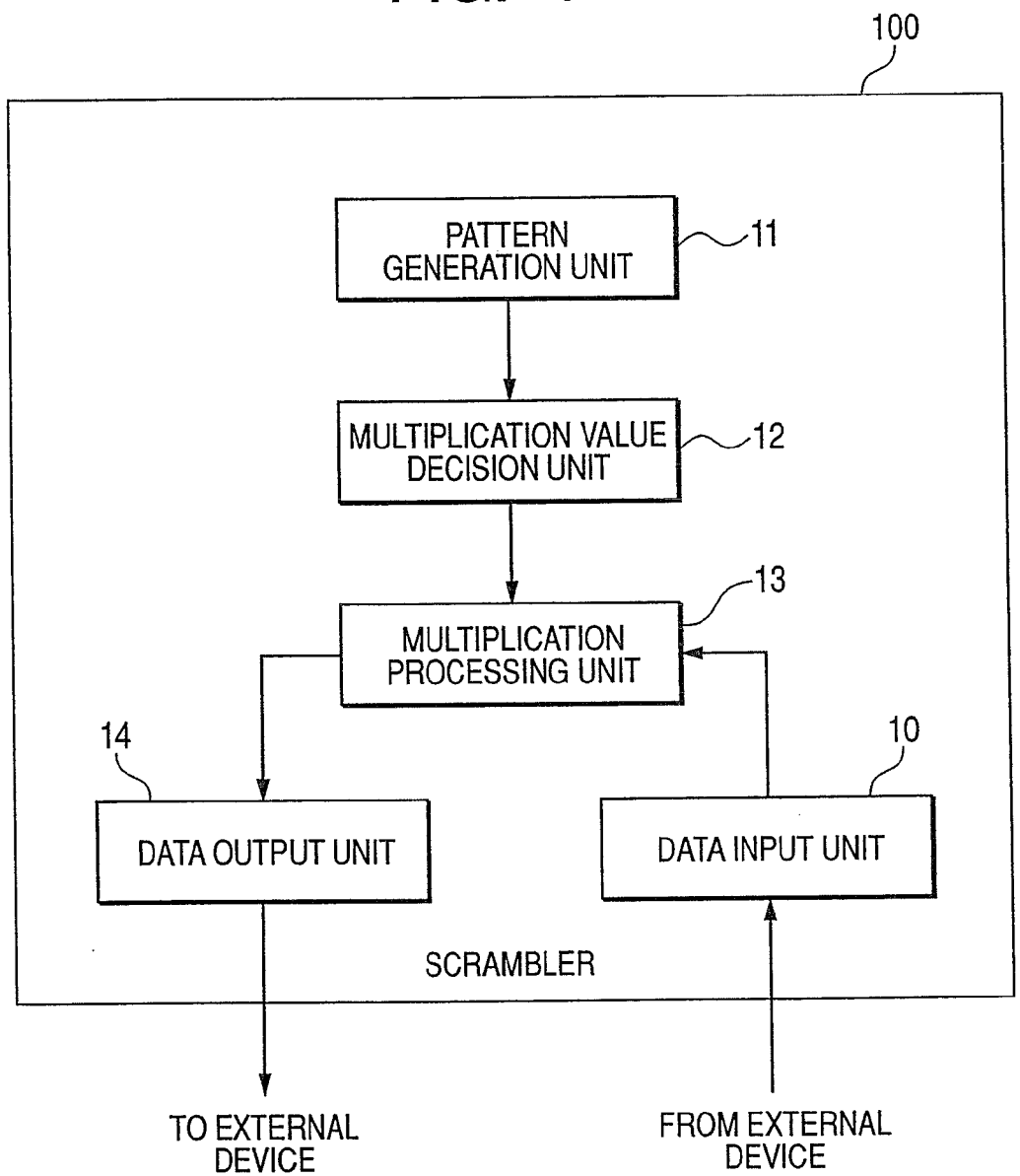
FIG. 1 shows an example of the configuration of the scrambler according to a mode for embodying the present invention.

FIG. 1 shows an example of the configuration of a scrambler 100 according to a mode for embodying the present invention. Each configuration shown in FIG. 1 can be, in a microcomputer system such as an LSI (large scale integration) loaded into a communication equipment for performing communications using a multivalue modulation system, for example, a 4-value FSK (frequency shift keying) modulation and the like, realized by software by a data processing device configured by a CPU (central processing unit), a DSP (digital signal processor), etc. executing a program stored in advance in ROM (read only memory), realized by a data processing device of hardware configured using an FPGA (field-programmable gate array), an ASIC (application specific integrated circuit), etc., or realized by a data processing device obtained by combining a predetermined hardware configuration and a software configuration. As shown in FIG. 1, the scrambler 100 includes a data input unit 10, a pattern generation unit 11, a multiplication value decision unit 12, a multiplication processing unit 13, and a data output unit 14.

The data input unit 10 externally takes in a data string to be scrambled as scramble target data into the scrambler 100. The data string taken in by the data input unit 10 is a symbol data string configured by a multinary symbol including at least in a value area a predetermined pair of a positive value and a negative value having an identical absolute value. A practical example of such a symbol data string can be a symbol data string being able to take each of the symbol values (+3), (+1), (−1), and (−3). This symbol data string includes in a value area two pairs of a positive value (+3) and a negative value (−3) having an absolute value of 3 and a positive value (+1) and a negative value (−1) having an absolute value of 1. The data input unit 10 can sequentially read a symbol of data to be scrambled in a predetermined area one by one from among the data having a frame structure stored in a predetermined frame buffer, memory, etc., and supply the read data to the multiplication processing unit 13.

The pattern generation unit 11 is configured by a logical circuit and the like for generating a PN code, for instance, and generates a scramble pattern formed by a binary bit string of "1" and "0". The scramble pattern generated by the pattern generation unit 11 is sequentially supplied, for instance, bit by bit to the multiplication value decision unit 12.

The multiplication value decision unit 12 determines a multiplication value for use in scrambling data to be scrambled corresponding to the bit value in each bit included in the binary bit string forming a scramble pattern generated by the pattern generation unit 11. The multiplication value decision unit 12 determines a positive or negative multiplication value corresponding to a bit value in each bit included in the binary bit string forming a scramble pattern. As a practical example, the multiplication value decision unit 12 determines "+1" as a multiplication value if the bit value is "1", and "−1" as a multiplication value if the bit value is "0" corresponding to each bit in the scramble pattern. That is, the multiplication value decision unit 12 determines a positive value of "+1" as a multiplication value when the value in each bit of a binary included in the scramble pattern is a predetermined value (for example, "1") defined in advance as a non-inverse operation value, and determines a negative value of "−1" as a multiplication value when the value in each bit included in the scramble pattern is a value (for example, "0") defined in advance as an inverse operation value. The multiplication value determined by the multiplication value decision unit 12 is notified/informed to the multiplication processing unit 13.

The multiplication processing unit 13 executes the multiplication between each piece of symbol data included in the symbol data string provided by the data input unit 10 and the multiplication value determined by the multiplication value decision unit 12. The data obtained by the multiplication of the multiplication processing unit 13 is output by the data output unit 14 from the scrambler 100 as scrambled data being stored at the address in the frame buffer read by the data input unit 10 or the like.

Figures 2, 3:
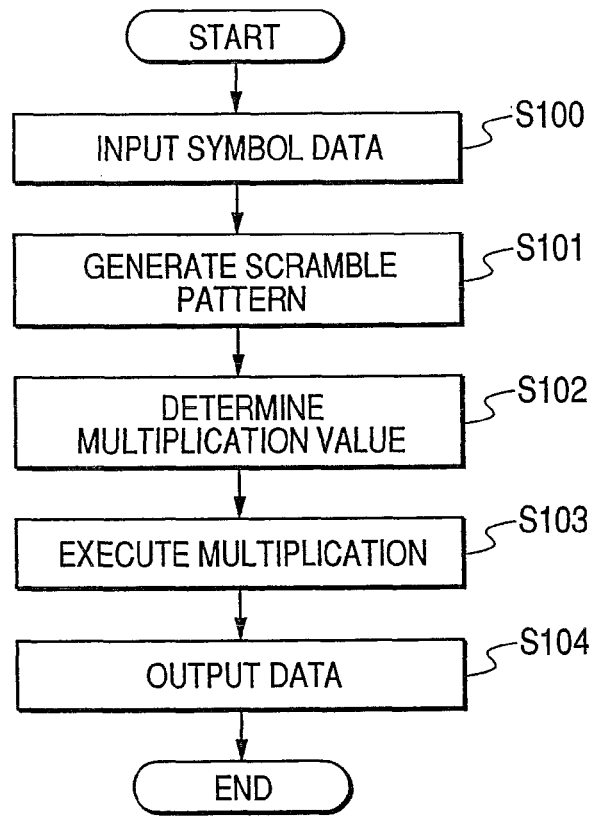
FIG. 2 is a flowchart showing an example of the process performed by the scrambler.
FIG. 3 shows an example of the program for realizing the process in steps S102 and S103 shown in FIG. 2.

Described below is the operation of the scrambler 100 having the above-mentioned configuration. FIG. 2 is a flowchart showing an example of the process performed by the scrambler 100. When the process in FIG. 2 starts, the data input unit 10 first and externally inputs to the scrambler 100 the data (symbol data) converted into a multinary symbol as data to be scrambled (step S100). The pattern generation unit 11 generates a PN code sequence and the like as a scramble pattern (step S101).

The multiplication value decision unit 12 determines a multiplication value for use in scrambling symbol data to be scrambled corresponding to the value of a supplied bit when scramble pattern generated in step S101 by the pattern generation unit 11 is sequentially supplied, for instance, bit by bit (step S102). Then, the multiplication processing unit 13 executes the multiplication between the data to be scrambled that is taken in by the data input unit 10 in step S100 and the multiplication value determined by the multiplication value decision unit 12 in step S102 (step S103). At this time, the multiplication processing unit 13 sequentially executes the multiplication between the data to be scrambled for one symbol and the multiplication value determined for the bit value of one bit included in the scramble pattern until it reaches the number of symbols represented by the data to be scrambled.

For example, assume that the symbol data (to be scrambled) for N symbols supplied from the data input unit 10 to the multiplication processing unit 13 is In[i] (N is a natural number, and $0 \leq i < N$), and the symbol data for N symbols transmitted from the multiplication processing unit 13 to the data output unit 14 if Out[i]. Also assume that the scramble pattern of N bits supplied from the pattern generation unit 11 to the multiplication value decision unit 12 is S[i]. In this case, the processes in steps S102 and S103 can be realized by, for example, a microcomputer system having a CPU executing the program as shown in FIG. 3. The program shown in FIG. 3 shows a source program in the case that the C language is used as a programming language.

The data indicating the value obtained by the multiplication processing unit 13 executing the multiplication is output from the scrambler 100 by the data output unit 14 as scrambled symbol data (step S104). Only any one of the processes in the respective steps shown in FIG. 2 is not necessarily selected and executed sequentially, but a plurality of processes may be concurrently executed by sharing the processes by each portion of the scrambler 100.

Figure 4:
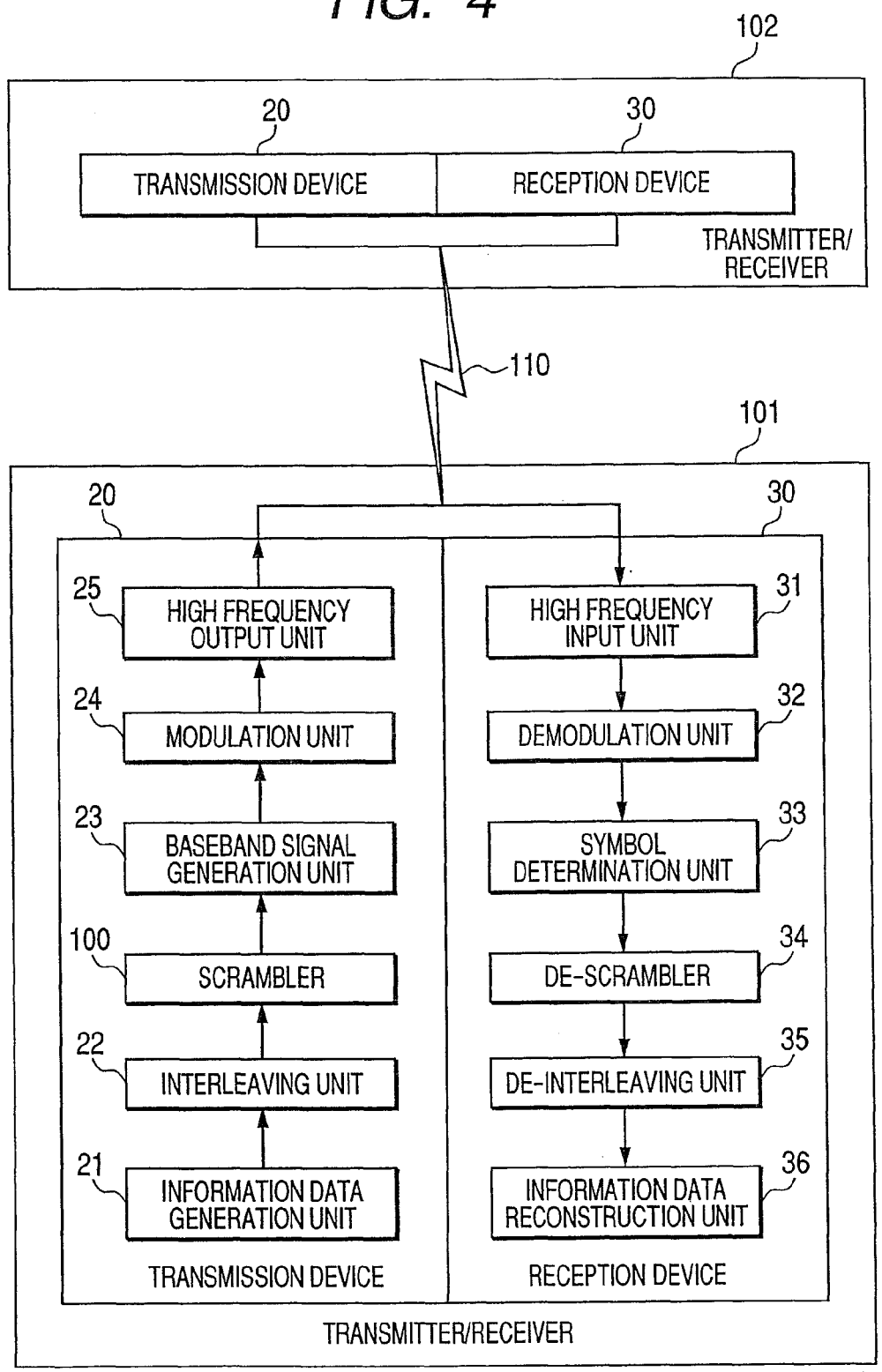
FIG. 4 shows an example of the configuration of the transmission/reception system including the transmitter/receiver to which the scrambler is applied.

The scrambler 100 for realizing the above-mentioned configuration and operation can be applied to transmitters/receivers 101 and 102 or the like configuring the transmission/reception system as shown in FIG. 4. Described below is a practical example of the scrambler 100 applied to the transmitters/receivers 101 and 102.

The transmitters/receivers 101 and 102 have substantially the same configurations, and communicate between them the information data, for example, of audio and images through an external transmission line 110 including an external packet network and the like. The transmitters/receivers 101 and 102 respectively have a transmission device 20 and a reception device 30. The transmission device 20 generates a modulated wave signal by performing multivalue modulation such as 4-value FS modulation and the like on the carrier wave having a predetermined frequency and transmits the signal to the other party's reception device 30 through the transmission line 110. The reception device 30 receives the modulated wave signal transmitted from the transmission device 20 of the transmitter through the transmission line 110, and restores audio and image information data and the like.

Each transmission device 20 of the transmitters/receivers 101 and 102 is provided with an information data generation unit 21, an interleaving unit 22, a baseband signal generation unit 23, a modulation unit 24, and a high frequency output unit 25 in addition to the scrambler 100 described above as shown in FIG. 4. Each reception device 30 of the transmitters/receivers 101 and 102 is provided with a high frequency input unit 31, a demodulation unit 32, a symbol determination unit 33, a de-scrambler 34, a de-interleaving unit 35, and an information data reconstruction unit 36 as shown in FIG. 4.

The information data generation unit 21 generates audio and image information data taken in from external environments and external devices, for example. Otherwise, the information data generation unit 21 can be the one which reads information data stored in advance in a predetermined storage device to output information data. The information data generated by the information data generation unit 21 can be divided into a plurality of frame columns. For example, each frame is formed by audio data and image data representing an audio waveform and pixel data obtained by segmenting audio and images in a predetermined period (for example, every 20 milliseconds).

The information data generation unit 21 classifies the information data contained in each frame into significant bit data and less significant bit data in accordance with a predetermined procedure. As a practical example, the 18-bit partial data as the most significant data in auditory sense designated in accordance with a predetermined criteria in the 44-bit data (coded audio data) obtained by coding an audio segment is classified into the most significant audio data which is the significant bit data. On the other hand, the 26-bit partial data that is the second most significant in auditory sense preceded by the most significant audio data in the coded audio data is classified into unprotected audio data which is less significant data.

As 1-frame information data, in addition to the most significant audio data and unprotected audio data, 23-bit protection data, 5-bit error detection data, etc. are included. The error detection data is classified into significant bit data. The protection data includes 18-bit audio protection data and 5-bit error detection data protection data. The value of each bit configuring protection data can be "1".

The interleaving unit 22 interleaves the information data generated by the information data generation unit 21. At this time, the interleaving unit 22 generates 2-bit symbol data corresponding to the symbol in the 4-value FSK modulation on the basis of the information data received from the information data generation unit 21.

Figure 5:
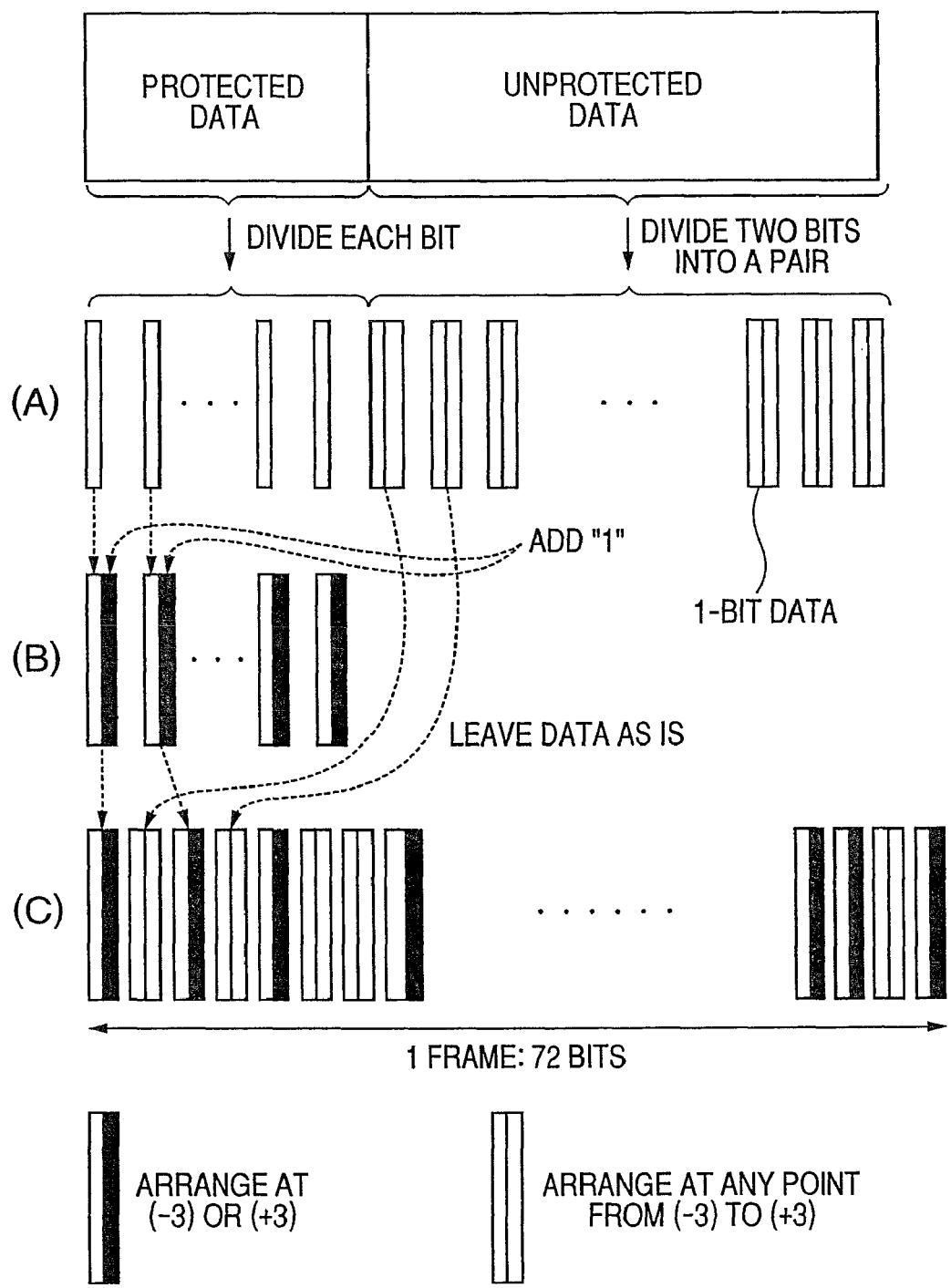
FIG. 5 is a schematic chart showing the process of interleaving information data.

For further detail, each bit of the significant bit data is divided as it is protection data as shown by part (A) of FIG. 5. Then, as shown by part (B) of FIG. 5, 2-bit data is generated by 1-to-1 combining bits each of which configures the protection data. The data which is generated at that time may be combined such that the bit configuring the protection data becomes a low order bit. On the other hand, for the less significant bit data, two bits is divided into one pair as unprotected data, as shown in part (A) of FIG. 5. The interleaving unit 22 provides a symbol data string for the scrambler 100 in a predetermined order including a portion in which the 2-bit data obtained in the dividing process for the protected data and the adding process of redundant bit data and the 2-bit data obtained in the dividing process for the unprotected data are alternately arranged as shown by part (C) of FIG. 5.

The scrambler 100 receives a supply of a symbol data string from the interleaving unit 22, and sequentially performs the process as shown in FIG. 2 for one symbol and one bit of a scramble pattern, thereby scrambling the symbol data string. The symbol data string scrambled by the scrambler 100 is provided for the baseband signal generation unit 23.

Figure 6:
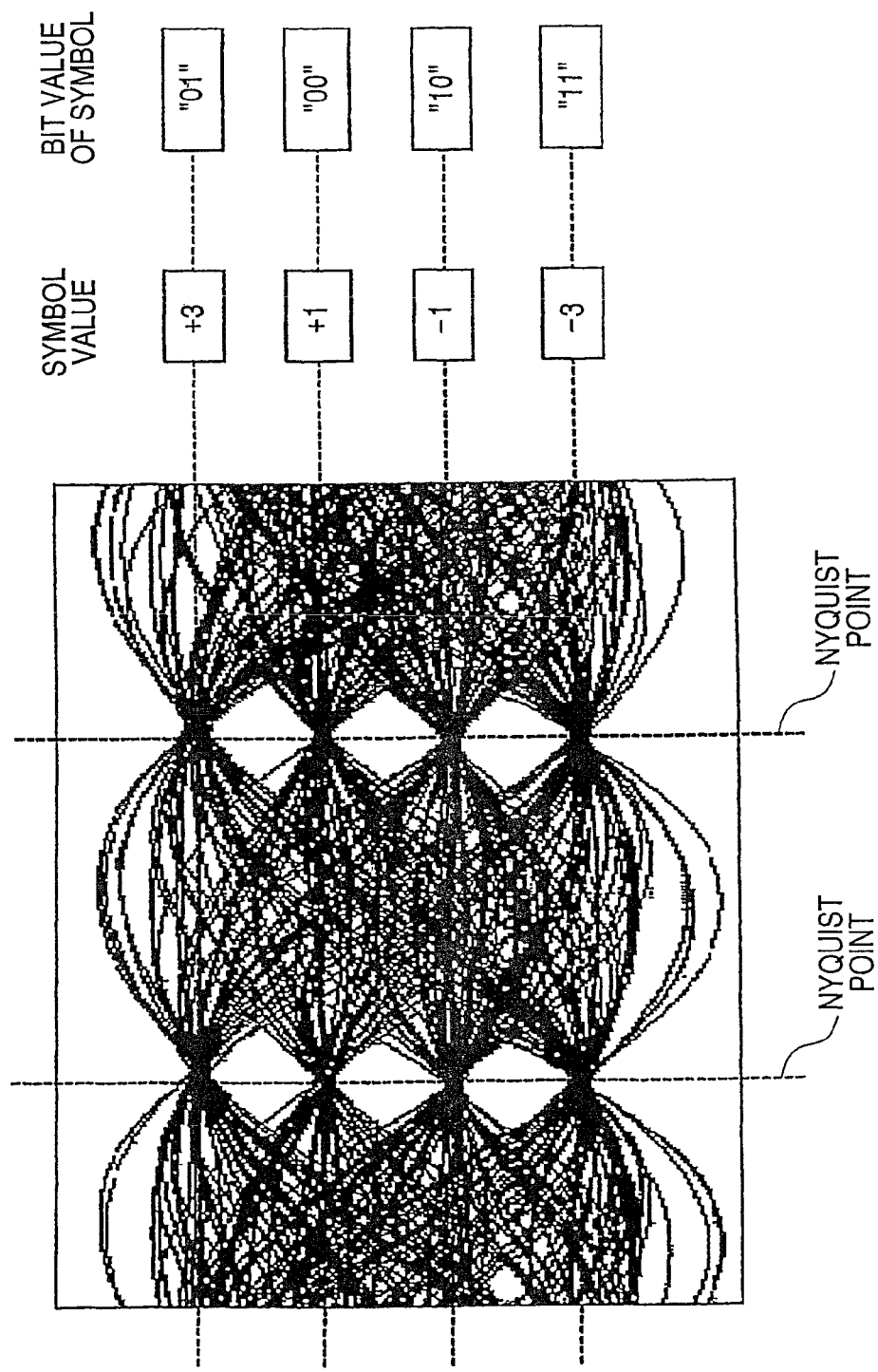
FIG. 6 shows an example of an eye pattern formed by a baseband signal.

The baseband signal generation unit 23 converts the symbol data string scrambled by the scrambler 100 into a baseband signal for use in the 4-value root-Nyquist FSK modulation. For example, the baseband signal generated by the baseband signal generation unit 23 forms an eye pattern as shown in FIG. 6. The momentary value of the baseband signal shown in FIG. 6 converges to any of the four values at the point of a predetermined phase (Nyquist point) in one symbol section (representing the information for one symbol). These four values (symbol values) are arranged in order from the largest, that is, (+3), (+1), (−1), and (−3) at equal intervals, assuming that the second largest value is (+1).

For example, the baseband signal generation unit 23 converts the symbol "11" (2-bit data having a value "11") included in the symbol data string into the symbol section in which the symbol value is (−3), converts the symbol "10" into the symbol section in which the symbol value is (−1), converts the symbol "00" into the symbol section in which the symbol value is (+1), and converts the symbol "01" into the symbol section in which the symbol value is (+3) as shown in FIG. 6. By the above-mentioned conversions, the four types of symbols form a gray code sequence making all of the Hamming distance between adjacent symbols being 1 when the symbol value s are arranged in the descending (or ascending) order. Also by the conversions, corresponding to the symbol having the low order digit of "1", a symbol section having the symbol value (−3) or (+3) is formed.

Since the value of each bit configuring the protection data is "1", all of the symbols including significant bit data are converted into the symbol section in which the symbol value is (+3) or (−3). That is, the symbol value of the symbol obtained by adding the protection data as redundant bit data to the significant bit data is set such that the minimum value of the difference of the symbol value between two different symbols can be larger than the minimum value obtained when a symbol is generated without adding the redundant bit data. That is, the Euclid distance in the data to be protected is set to be larger than that of the data not to be protected. In the practical example shown in FIG. 6, the symbol value of the symbol obtained by adding redundant bit data can be the maximum value or the minimum value in the value area, but the symbol value of the symbol obtained without adding the redundant bit data can take all values contained in the value area.

Thus, by adding the protection data as redundant bit data to the significant bit data, the possible symbol value is restricted, but the interval of the symbol value (Euclid distance) is being substantially extended. Thus, the signal-to-noise ratio can be improved. Furthermore, by/with the process performed at/in the interleaving unit 22, part in which the symbol section corresponding to the symbol data including the significant bit data and the symbol section corresponding to the symbol data including the less significant bit data are alternately arranged is included. Thus, although when the significant bit data is dispersed in a baseband signal and there is an influence of fading and the like during the transmission of a modulated wave signal, the risk that a large amount of significant bit data is collectively lost can be reduced.

As described above, the baseband signal generated by the baseband signal generation unit 23 is supplied to the modulation unit 24. The modulation unit 24 frequency-modulates (4-value FSK modulation) the carrier wave using the baseband signal generated by the baseband signal generation unit 23. The obtained modulated wave signal is supplied to the high frequency output unit 25. The high frequency output unit 25 power-amplifies the modulated wave signal supplied by the modulation unit 24, and transmits it to the transmission line 110.

In the reception device 30, the high frequency input unit 31 amplifies the signal received through the transmission line 110, for example, and provides the resultant signal for the demodulation unit 32. The demodulation unit 32 restores the baseband signal by detecting the received signal supplied by the high frequency input unit 31. The baseband signal is supplied to the symbol determination unit 33.

On the basis of the momentary value at each Nyquist point of the baseband signal received from the demodulation unit 32, the symbol determination unit 33 determines the symbol represented by each symbol section including the respective Nyquist points. Based on the determination result, a scrambled symbol data string is regenerated. The symbol data string regenerated at this time is supplied to the de-scrambler 34.

The de-scrambler 34 regenerates a symbol data string interleaved by the interleaving unit 22 by executing the multiplication between the symbol data string received from the symbol determination unit 33 and the multiplication value corresponding to the scramble pattern as with the scrambler 100. Thus, the symbol data string regenerated by the de-scrambler 34 is supplied to the de-interleaving unit 35.

The de-interleaving unit 35 regenerates an information data string by performing the process in the inverse procedure to the interleaving unit 22 on the symbol data string received from the de-scrambler 34. For example, the de-interleaving unit 35 determines on the basis of the order of each symbol in a frame whether each piece of symbol data is classified into significant bit data or less significant bit data. At this time, the symbol data classified into significant bit data is divided into, for instance, one high order bit and one low order bit, and the data of the high order bit is extracted. On the other hand, the entire 2-bit data of the symbol data classified into less significant bit data is extracted. The thus extracted data is associated with each other and supplied to the information data reconstruction unit 36.

The information data reconstruction unit 36 configures and reconstructs the data string received from the de-interleaving unit 35 as information data. For example, the information data reconstruction unit 36 has a lookup table describing the correspondence between the data string received from the de-interleaving unit 35 and information data, and reconstructs information data corresponding to the data string received from the de-interleaving unit 35 by referring to the table.

In the transmission device 20 to which the above-mentioned scrambler 100 is applied, it is assumed that the symbol data as shown by part (A) of FIG. 7 is supplied from the interleaving unit 22 to the scrambler 100. When the baseband signal generation unit 23 makes a conversion into a baseband signal without scrambling the symbol data as shown by part (A) of FIG. 7, the baseband signal having the waveform as shown by part (A) of FIG. 8 is obtained. The signal level of the baseband signal having the waveform as shown by (A) of FIG. 8 is biased toward the positive area. Therefore, the modulation by the modulation unit 24 is biased, and the energy concentrates in a modulated wave signal.

Then, in the scrambler 100, the pattern generation unit 11 generates a scramble pattern as shown by, for example, part (B) of FIG. 7. Corresponding to the scramble pattern, the multiplication value decision unit 12 determines a multiplication value as shown by, for example, part (C) of FIG. 7, and reports it to the multiplication processing unit 13. The multiplication processing unit 13 executes the multiplication between each symbol value in the symbol data as shown by (A) of FIG. 7 and each multiplication value as shown by part (C) of FIG. 7. On the basis of the result of the multiplication, the data output unit 14 transmits the symbol data representing the output symbol as shown by, for example, (D) of FIG. 7 is transmitted to the baseband signal generation unit 23.

Thus, when the thus scrambled symbol data is converted into a baseband signal by the baseband signal generation unit 23, the baseband signal having the waveform shown by part (B) of FIG. 8 is obtained. In the baseband signal having the waveform as shown by part (B) of FIG. 8, the signal level is scattered in both positive and negative areas. Thus, the bias in the modulation by the modulation unit 24 can be eliminated, and the energy in the modulated wave signal can be dispersed/scattered. In addition, the scrambled symbol data is quite different from the unscrambled symbol data. The reception device 30 cannot correctly reconstruct the symbol data without knowing the scramble pattern generated by the pattern generation unit 11 of the transmission device 20. As a result, the confidentiality of information can be secured.

As explained above, according to the present invention, a positive or negative multiplication value such as "+1", "−1", etc. is determined corresponding to the bit value of each bit included in the binary bit string forming a scramble pattern generated by the pattern generation unit 11. Then, the multiplication processing unit 13 executes the multiplication between the symbol data representing each symbol value in the symbol data string configured by a multinary symbol including in the value area a predetermined set of a positive value and a negative value having an identical absolute value such as (+3), (+1), (−1), and (−3), for example, and the multiplication value determined by the multiplication value decision unit 12. Thus, in a simple operation such as the multiplication between a symbol value and a multiplication value, the symbol data string can be scrambled. Furthermore, since the multiplication is performed in a symbol unit, not in a bit unit, data can be scrambled in a simple process without changing the contents of the process even when the position of a significant bit element is changed after the contents of the function channel are changed, for instance, such as the case when audio data is changed into data for communication control.

In the above-mentioned mode for embodying the present invention, the 4-value root-Nyquist FSK modulation system is used as a multiplication value modulation system. However, the present invention is not limited to this application. For example, the present invention can also be applied to any multiplication value modulation system such as a multiplication value modulation system using 4 or more values, a PSK (phase shift keying) modulation system, etc.

Furthermore, the scrambler 100 according to the present invention is not limited to an exclusive system, but can be realized using a common computer system. For example, a program is installed from a storage medium (for example, an optical disk, a magneto optical disk, a magnetic disk, IC memory, etc.) storing the program for realizing the configuration and functions of the scrambler 100 described above to a microcomputer system loaded into communication equipment for performing communications in the multiplication value modulation system. Thus, the scrambler 100 for performing the above-mentioned process can be configured.

Furthermore, for example, the program is uploaded into the information processing device (for example, a server device) on an electric communication network, and can be distributed via a communication line. Additionally, a carrier wave can be modulated using an electrical signal representing the program, an obtained modulated wave signal is transmitted, a device that has received the modulated wave signal can demodulate, the signal and acquire the program. The program can be activated and executed as with other application programs under the control of a predetermined OS (operating system), thereby performing the above-mentioned processes.

When the OS shares a part of a process, or when the OS forms part of the components of the present invention, the program excluding the part can be stored in a storage medium. Also in this case, according to the present invention, it is assumed that a program for performing each function or step to be executed by a computer is stored in a storage medium.

Industrial Applicability

A simple signal processing operation can realize a communication system for digital information having excellent error resistance.

What is claimed is:

1. A scramble method for performing a scrambling of symbols using a data processing device, the method comprising:
    a pattern generating step of generating a scramble pattern for each symbol using the data processing device;
    a multiplication value decision step of determining a positive or negative multiplication value corresponding to a bit value of each bit contained in a binary bit string forming a scramble pattern generated by the pattern generation step using the data processing device;
    a symbol data generating step of inputting a data string whose significance level is predetermined, dividing significant data of the data string to generate high-importance bit data each having one bit and adding a predetermined unique bit data having a predetermined n bits to generate symbolized 1+n bits high-importance bit data, and dividing less significant data of the data string into 1+n bits data to generate symbolized 1+n bits low-importance bit data, thereby generating symbol data arranged based on each 1+n bits data using the data processing device; and
    a multiplication processing step of multiplying one of the symbol data with the multiplication value determined by the multiplication value decision step using the data processing device,
    wherein the predetermined unique bit data is not from the input data string and is only added to the high-importance bit data, and
    wherein the predetermined unique bit data is common to symbol data having largest Euclid distance so that the 1+n bits high-importance bit data is always made to a symbol having the largest Euclid distance.

2. The scramble method according to claim 1, wherein the predetermined unique bit data is added to the most significant bit as high-importance divided bit data.

3. The scramble method according to claim 2, wherein a sequence of four symbols generated by the symbol data generation step is a gray code.

4. The scramble method according to claim 1, further comprising an interleaving process step of laying a symbol having significant data and a symbol having less significant data in alternate sequence.

5. The scramble method according to claim 1, wherein n equals 1.

6. A baseband generating method for performing scrambling of symbols using a baseband signal generating device, the method comprising:
    a pattern generating step of generating a scramble pattern for each symbol;
    a multiplication value decision step of determining a positive or negative multiplication value corresponding to a bit value of each bit contained in a binary bit string forming a scramble pattern generated by the pattern generation step;
    a symbol data generating step of inputting a data string whose significance level is predetermined, dividing significant data of the data string to generate high-importance bit data each having one bit and adding a predetermined unique bit data having a predetermined n bits to generate symbolized 1+n bits high-importance bit data, and dividing less significant data of the data string into 1+n bits data to generate symbolized 1+n bits low-importance bit data, thereby generating symbol data arranged based on each 1+n bits data;
    a multiplication processing step of multiplying one of the symbol data with the multiplication value determined by the multiplication value decision step; and
    a baseband signal generation step of generating a baseband signal representing a string of $2^{1+n}$ level symbols acquired as a result of the multiplication by the multiplication processing step using the baseband signal generating device,
    wherein the predetermined unique bit data is not from the input data string and is only added to the high-importance bit data, and
    wherein the predetermined unique bit data is common to symbol data having largest Euclid distance so that the 1+n bits high-importance bit data is always made to a symbol having the largest Euclid distance.

7. The baseband generating method according to claim 6, wherein the predetermined unique bit data is added to the most significant bit as high-importance divided bit data.

8. The baseband generating method according to claim 7, wherein a sequence of four symbols generated by the symbol data generation step is a gray code.

9. The baseband generating method according to claim 6, further comprising an interleaving process step of laying a symbol having significant data and a symbol having less significant data in alternate sequence.

10. The baseband generating method according to claim 6, wherein n equals 1.

* * * * *